United States Patent [19]

Barnhouse et al.

[11] Patent Number: 4,719,263

[45] Date of Patent: Jan. 12, 1988

[54] ANTISTATIC PLASTIC MATERIALS CONTAINING EPIHALOHYDRIN POLYMERS

[75] Inventors: James P. Barnhouse; Simon H. Yu, both of North Ridgeville, Ohio

[73] Assignee: The B. F. Goodrich Company, Akron, Ohio

[21] Appl. No.: 732,541

[22] Filed: May 10, 1985

[51] Int. Cl.$^4$ ............................................. C08L 71/02
[52] U.S. Cl. ..................................... 525/187; 525/65; 525/403; 525/404; 525/405; 525/407; 525/408; 260/DIG. 17
[58] Field of Search ............... 525/187, 405, 407, 408, 525/403, 404, 430, 64; 524/910; 252/500; 260/DIG. 17

[56] References Cited

U.S. PATENT DOCUMENTS 3,275,573 9/1966 Vandenberg .......................... 260/2
4,588,773 5/1986 Federl et al. .......................... 525/64

FOREIGN PATENT DOCUMENTS 1907024 4/1971 Fed. Rep. of Germany ...... 525/187

*Primary Examiner*—Theodore E. Pertilla
*Attorney, Agent, or Firm*—Gregory N. Clements

[57] ABSTRACT

Thermoplastic and thermoset materials containing an effective amount of an antistatic agent for improving antistatic properties thereof, the antistatic agent is selected from homopolymers and copolymers of an epihalohydrin.

5 Claims, No Drawings

ANTISTATIC PLASTIC MATERIALS CONTAINING EPIHALOHYDRIN POLYMERS

BACKGROUND OF THE INVENTION

When formed into such articles as molded objects or films, synthetic polymers are known to generate and accumulate electrostatic charges When charged, such objects tend to accumulate concentrations of dirt and soil which are unsightly in appearance and interfere with the use of such objects. When nylon or polyester polymers are formed into fibers, the electrostatic charges create processing problems whereas in consumer use, carpeting made from such synthetic fibers has a tendency to generate annoying shocks in cold, dry weather, while in apparel, the charged fabric clings embarassingly to the wearer and shocks the wearer when the garment is being removed. Furthermore, such garments have an increased tendency to attract lint and soil.

The problem of electrostatic charge and arcing that it can create, is also of great concern in clean rooms, such as hospital surgery rooms, as well as chemical plants and laboratories, and electronic equipment, in particular. Arcing due to an electrostatic charge can cause an explosion or can damage electronic equipment.

To overcome the static electricity problem, topical antistats have been used to eliminate the electrical charges, however, such treatments have proven to be of little benefit in the consumer applications due to lack of permanency. Other methods used to reduce the electrostatic charges included copolymerization of monomers containing ionizable groups, surface grafted polymerization of antistatic monomers, inclusion of metallic fibers or carbon-coated filaments, incorporation of an antistatic additive in the matrix polymer, and the like.

The prior art is replete with teachings to reduce antistatic charges in various polymeric structures. Certain prior art patents describe the incorporation of antistatic materials in various polymeric structures which are used to mold or extrude rigid objects such as luggage, protective covers, and automobile parts. There is also a vast body of prior art patent literature directed to the elimination of the static charges in fiber and films.

After doing the work described herein, several written items came to our attention which, in part, were relevant to our work. Item #1 is Invention Record No. 2903 dated Apr. 4, 1967, of A. C. Sancineto that describes molding of a 50/50 blend of an Abson ® material, a terpolymer of acrylonitrile, butadiene, and styrene (ABS resin), with Hydrin ®100 polymer, a homopolymer of epichlorohydrin. The materials were compatible and were easily molded. The notched Izod of the ABS plastic alone was 2.6 J/cm of notch whereas that of the blend was 7.6 J/cm. Suggestion was made to vary amount of the ingredients in an attempt to develop a material to compete with Marbon's super impact Cycolac material.

Item #2 is a report dated July 23, 1970 by R. J. Meyer and C. V. Purks entitled "Evaluation of Hydrin as a Rigid PVC Additive". This report discloses that Max Roha, then an employee of The B. F. Goodrich Company, on a trip to Europe was informed that Wacker Chemie GMBH in West Germany was adding Herclor ® C resin to rigid PVC to improve impact strength and to impart antistat characteristics. Herclor C is similar to Hydrin 200, i.e., a copolymer of epichlorohydrin and ethylene oxide in the weight ratio of about 60-70/40-30. This report discusses results of tests conducted on the use of Hydrin 100, a homopolymer of epichlorohydrin, and Hydrin 200, a copolymer of epichlorohydrin. This report made the following conclusions:

(a) antistatic characteristics resulted from the separate addition of 8 or more parts of each Hydrin 200 and Herclor C to rigid PVC.

(b) Hydrin 100 failed to impart antistatic characteristics to rigid PVC at levels of up to 12 pphr.

(c) thermal stability of rigid PVC compounds containing up to 12 pphr Hydrin 100 and Hydrin 200 is adequate. Herclor C reduces thermal stability.

(d) impact strength development with Hydrin was inadequate.

Item #3 is an inter-office memo dated Feb. 2, 1971 from J. T. Oetzel to N. G. Duke and C. E. Fleming entitled "Hydrin 200 as a PVC-Antistat." This memo summarizes meetings and phone conversations made with people in PVC product groups and generally discusses certain applications and the need for antistatic property in PVC products.

Item #4 is also an inter-office memo dated Feb. 2, 1967 from J. T. Oetzel to N. G. Duke and C. E. Fleming entitled "Hydrin 200 as an Antistatic Agent for Carpeting Fibers." This memo states that Hydrin 200 will be evaluated as an antistatic agent for Nylon 66 and other carpet fiber materials, and that the Hydrin material will be mixed with the resin and basic properties along with antistatic characteristics will be checked. C. Purks was to do this work. This memo also states that an invention record had been submitted.

We were not aware of any of the prior work noted above when we started working on the subject matter disclosed and claimed herein. Furthermore, we did not find the invention record referred to by J. T. Oetzel in his February 2 memo to Messrs. Duke and Fleming.

More recently, certain technical literature was mailed with our knowledge to Hydrin polymer customers. This literature, which is denoted as items #5 and #6 herein, was mailed to the customers in about the first or second quarter of 1984. Item #5 is entitled "Hydrin Rubber As A Flexible PVC Antistat" whereas item #6 is entitled "Hydrin Rubber As A Rigid Vinyl Antistat". Both of these items report test data on rigid and flexible PVC containing varying amounts of Hydrin materials along with physical properties, including static electrical tests.

SUMMARY OF THE INVENTION

This invention is directed to plastic materials, which include thermoplastics and thermosets, containing an effective amount of an epihalohydrin-containing polymer as an antistat agent. Examples of thermoplastic materials include polymers of acrylonitrile, butadiene, and styrene, also known as ABS polymers; polyamides or nylons; polyesters; polyvinyl chloride; chlorinated polyvinyl chloride; and polycarbonates. Examples of thermosetting materials include epoxy and phenolic resins. The plastic materials contain 1 to 50 weight parts of an epihalohydrin polymer antistatic agent per 100 weight parts of the plastic material.

DETAILED DESCRIPTION OF THE INVENTION

The deleterious effects of electrostatic charge is reduced or eliminated by inclusion in a plastic material an epihalohydrin antistatic agent selected from epihalohydrin homopolymers and epihalohydrin copolymers. An effective amount of the antistatic agent is used in the plastic material to induce charge dissipation by at least 50% in less than 10 seconds on application of 1000 volts of direct current at 23.5° C. and 50% RH. More specifically, the electrostatic agent can be used in amount of 1 to 50 weight parts, preferably 2 to 30 weight parts, per 100 weight parts of the plastic material.

The antistatic agent can be in liquid or solid form. When in liquid form, it can be blended with the solid plastic material by mixing the two materials together until the plastic material absorbs the liquid antistatic agent When the antistatic agent is in a solid form, such as powder, it is mixed with the plastic material until it is uniformly distributed throughout the plastic material. It should be apparent that the antistatic agent becomes an integral part of the plastic material after it is molded, however, it can also be used as a surface treatment therefor.

The Dreyfuss U.S. Pat. Nos. 3,850,856 and 3,850,857 disclose commercially available liquid epihalohydrin polymers prepared by cationic ring-opening polymerization. The epihalohydrin polymers disclosed in these patents can be used as antistatic agents in the manner described herein. The '857 Dreyfus patent discloses a process for polymerizing an epihalohydrin using as a catalyst a trialkyloxonium salt of an $HMF_6$ acid where M is a Group V element selected from phosphorous, arsenic, and antimony. The '856 Dreyfuss patent discloses an improvement over the '857 patent wherein polymerization of an epihalohydrin is carried out in the presence of water or ethylene glycol. The resulting polymers of an epihalohydrin prepared pursuant to the Dreyfuss patent '856 have hydroxyl termination. Any of the other alkylene glycols can also provide hydroxyl termination.

The liquid antistatic agents referred to herein have Brookfield viscosity below 16,000,000 cps at 25° C. More specifically, such liquid polymers or antistatic agents have viscosity measured at 25° C. in the range of 100 to 10,000,000 cps, preferably 200 to 2,000,000 cps and have number average molecular weight of 200 to 30,000, preferably 300 to 15,000, as determined by gel permeation chromatography using polystyrene as the calibration standard.

Solid epihalohydrin polymers are also well known commercial elastomers which can also be used as antistatic agents. A particularly useful class of these materials are copolymers of an epihalohydrin and an alkylene oxide. These copolymers are readily prepared by polymerization in mass or solution with catalysts normally formed by reacting an organoaluminum compound with water, and optionally, with a small amount of a chelating agent. These copolymers normally have a number average molecular weight greater than about 30,000, preferably in excess of 60,000, as determined by gel permeation chromatography. The Oetzel U.S. Pat. No. 4,251,648 describes such solid polymers of epihalohydrin also containing an unsaturated epoxy comonomer which makes it possible to cure such copolymers with an organic peroxide.

The epihalohydrin monomers useful in preparing polymeric epihalohydrin antistatic agents of this invention include epichlorohydrin, epibromohydrin, epiiodohydrin, and epifluorohydrin, although eipchlorohydrin is preferred. The antistatic agents include the epihalohydrin homopolymers and copolymers thereof with one or more comonomers selected from 1,2-epoxide monomers, particularly alkyl glycidyl ethers and alkylene oxides of 2 to 6 carbon atoms, particularly ethylene oxide and propylene oxide. In these copolymers, amount of an epihalohydrin can vary from about 5 to 95 weight parts whereas. one or more of the comonomers are used in an amount of 95 to 5 weight parts. Particularly preferred copolymers are solid, as in powder form, consisting of 5 to 95 weight parts epihalohydrin, preferably 10 to 60 weight parts, with 95 to 5 weight parts, preferably 90 to 40 weight parts, of one or more comonomers, such as ethylene oxide or propylene oxide, all on the basis of a total of 100 weight parts. The presence of an epihalohydrin in the antistatic agent appears to improve compatibility between the antistatic agent and the plastic material with which it is blended.

Other antistatic agents can also be included in the plastic compositions, along with the antistatic agents already described. Some examples of such other antistatic agents include long chain and ethoxylated amines and amides, and quarternary ammonium salts.

The plastic materials are generally divided into thermoplastics and thermosets. This invention is generally directed to imparting antistatic character to plastic materials, including engineering plastics. Thermosetting resins are those in which a heat-stable crosslinked polymer network extends throughout the finished fabricated article. This is in contrast to thermoplastics, which can be made to soften and flow by the application of heat.

As already noted, the plastic materials can be modified with an antistatic agent in order to impart antistatic character thereto. Whether the antistatic agent is liquid or in solid form, the object of the invention herein is attained by mixing the antistatic agent with a suitable plastic material until the materials are uniformly dispersed. Examples of suitable thermoplastic materials include ABS polymers, polyvinyl chloride, chlorinated polyvinyl chloride, nylons and polyamides, polycarbonates, and polyesters. Examples of thermosetting materials include epoxies and phenolics.

Acrylonitrile-butadiene-styrene (ABS) resins have a wide variety of compositions, preparation conditions, and properties. The resins are typically tough and rigid, easy to extrude or mold, and have good abrasion resistance. They can be blended with other resins, especially with poly(vinyl chloride), and can be shaped by almost any plastics-fabrication process: injection molding, extrusion, or thermoforming. They are used in many automotive, marine and communication applications. In building products, they are used for pipes, ducts, and structural foam.

Proportions of monomers normally used to make ABS resins are about 40 to 90 weight parts of combined acrylonitrile and styrene, with about 60 to 10% of butadiene. The amount of acrylonitrile is preferably from about 10 to 60 parts by weight. Blends of ABS resins with other polymers such as vinyl chloride polymers, styrene polymers, methyl methacrylate polymers, polyurethanes, polycarbonates, and the like may also be used. Any ABS compound that can be extruded or molded can be used in accordance with this invention.

Vinyl chloride polymers are produced in two main types, homopolymers and copolymers, usually with vinyl acetate or one or more other polymerizable olefinic monomers having at least one terminal $CH_2=C<$ group. Both types can be plasticized by a wide variety of plasticizers, usually esters. Rigid or unplasticized PVC is used extensively for pipe. The plasticized material is used largely in floor coverings. The homopolymer itself is inherently fire resistant, but addition of plasticizers, unless they are especially fire resistant, considerably reduces this characteristic.

Rigid polyvinyl chloride is a low cost thermoplastic material having in combination, good impact strength, good moldability, low weight, and resistance to combustion, corrosion and attack by acids. For these reasons, it has found wide application in products such as building panels, pipes, pipe fittings, ducts, blown bottles and the like, which are made from rigid vinyl polymer compounds by extrusion, calendering or molding. To make polyvinyl chloride suitable for fabrication by these methods, it is necessary to add to it one or more stabilizers, lubricants, pigments and polymer modifiers.

The chlorinated polyvinyl chloride employed in the present invention can be readily prepared by the post-chlorination of commercially available polyvinyl chloride. Prior to post-chlorination, the polyvinyl chloride generally has a chlorine content of about 56.7% by weight, a glass transition temperature of from about 75° to 80° C., and a density of about 1.40 grams per cubic centimeter. Polyvinyl chloride can be post-chlorinated by a number of procedures including chlorination in a solution; chlorination in an aqueous suspension, or a suspension in a swelling agent; and direct chlorination of dry, polyvinyl chloride powder.

Chlorinated polyvinyl chloride is generally defined as having a minimum chlorine content of at least 60% by weight, and for practical purposes, a maximum chlorine content of about 75%. In a preferred embodiment, chlorinated polyvinyl chloride has a chlorine content of about 64 to 73%.

The glass transition temperature (Tg) is that temperature below which a polymer remains hard and glassy as opposed to soft and rubbery. The glass transition temperature of chlorinated polyvinyl chloride increases with increasing chlorine content. Polyvinyl chloride itself has a glass transition temperature of about 75°–80° C., while typical glass transition temperatures for chlorinated polyvinyl chloride suitable for the present invention are about 87° C. for 60% chlorine content, about 106° C. for 64% chlorine content, about 128° C. for 68% chlorine content, and about 178° C. for 75% chlorine content.

Chlorinated polyvinyl chloride can be a homopolymer or a copolymer thereof with a minor amount of one or more copolymerizable monomers. Generally, up to about 20% by weight of the vinyl chloride can be replaced by one or more of copolymerizable monomers, such as monoolefinic copolymerizable monomers.

Nylon is a generic name for any long-chain, synthetic, polymeric amides in which recurring amide groups are integral with the main polymer chain. There is a wide choice of starting materials from which polyamides can be synthesized. The two primary mechanisms for polyamide manufacture are condensation of a diamine and a dibasic acid, or their equivalents, or polymerization of cyclic monomers.

Polycarbonates are a special class of polyesters derived from the reaction of carbonic acid derivatives with aromatic, aliphatic, or mixed diols. They can be produced by reacting phosgene with a diol in the presence of an appropriate hydrogen chloride acceptor, or by melt transesterification reaction of a diol and a carbonate ester. The three dihydrobenzenes, i.e., hydroquinone, resorcinol, and catechol, can react with phosgene in pyridine. Hydroquinone and resorcinol yield polymers whereas catechol produces a cyclic carbonate. Diethylene glycol chloroformate can be reacted with allyl alcohol to yield a polycarbonate that is highly crosslinked, colorless, scratch-resistant and transparent which is used in optical applications. Aromatic polycarbonates are highly stable to heat, are mechanically tough, transparent engineering thermoplastics.

Polycarbonates are frequently employed as lightweight, break-resistant glass substitutes in light-transmission applications. An example of such an application is transparent canopies for high-speed aircraft. The high impact strength combined with transparency and high flexural strength, make polycarbonate sheet a candidate for bullet-resistant glazing.

Thermoplastic polyesters are condensation products that are characterized by many ester linkages distributed along the polymer backbone. The first of this class to be commercialized was poly(ethylene terephthalate). It was introduced in 1953 as a textile fiber and soon thereafter in film form. In 1966, the first injection-molding grades of poly(ethylene terephthalate) were introduced, but recent injection-molding grades of modified poly(ethylene terephthalate) show improvements over the earlier materials. Poly(butylene terephthalate), also is referred to as poly(tetramethylene terephthalate), was first introduced commercially in 1970. Early injection-molding grades included nonreinforced, glass-reinforced, and flame-retardant products. It is characterized by excellent mold flow and short molding cycles with excellent chemical resistance and performance at elevated temperature.

Thermoset polyesters are macromolecules with polyester backbones derived from the interaction of unsaturated acids or anhydrides and polyhydric alcohols. The reaction normally proceeds at 190°–220° C. until a predetermined acid value-viscosity relationship has been achieved. Solutions of these polymers in vinyl monomers, such as styrene, often are called polyester resins. They are compounded with fillers or fibers, or both, in the liquid stage and then are cured with the aid of free-radical initiators to yield thermoset articles. Market penetration, especially in the area of fiber-glass reinforcement, is greatly enhanced as a result of greater latitudes in compounding and processing than is possible with other polymeric systems. Thermoset polyesters can be mass-cast, laminated, molded, pultruded, and made into gel coats in a variety of colors. Depending on the application, the physical and chemical properties of the product often can be met by judicious choice of polyester backbone ingredients and the type and amount of the diluent vinyl monomer.

The epoxy resins are thermosetting polyethers which can be made by condensing an epihalohydrin, particularly epichlorohydrin, with a polyhydric phenol in the presence of an alkali. The phenol can be diphenylolpropane or bisphenol A. An excess of an epihalohydrin is used to insure the presence of epoxide groups on the ends of the polymer chains.

The epoxy resins have limited application in the uncured state. Curing reactions involve the hydroxyl groups along the chain and the epoxy end groups. Curing agents include thermosetting resins with methylol groups present, fatty acids or acid anhydrides, and amines or other nitrogen compounds. Amines are the preferred curing agents. The cured resins have good flexibility, adhesion, and chemical resistance.

The chief commercial use of the epoxide resins is in surface coatings. They can be combined with phenolic resins for use in the internal coating of food cans or in ware enamels, or with urea resins to give white enamels. Other uses of the epoxy resins include casting or potting resins for embedding electrical components, low pressure laminates, usually with glass fibers, adhesives, and stabilizers for vinyl resins.

Phenolic thermosetting resins have been known for a long time. Phenols react with aldehydes to give condensation products if there are free positions on the benzene ring ortho and para to the hydroxyl group. Formaldehyde is by far the most reactive aldehyde and is used almost exclusively in commercial production. The reaction is always catalyzed either by acids or bases. The nature of the product is greatly dependent on the type of catalysts used. Urea-formaldehyde and melamine-formaldehyde resins are also included in this category.

The first products of the alkali-catalyzed reaction between a phenol and formaldehyde are known as resoles. If all three of the ortho and para positions in the phenol are free to react, crosslinked materials are quickly formed. The reactions are normally separated into three known phases of A-stage, B-stage, and C-stage. In the final stage of reaction or the C-stage, a great deal of crosslinking takes place and the resin becomes insoluble and infusible.

Phenolic resins are widely used as adhesives, for low pressure laminating, in varnishes, and in coatings.

Many of plastic materials described above are commercial and are readily available. They can be modified by incorporating therein an effective amount of an antistatic agent in order to impart thereto antistatic character, as well as other conventional additives. Such modified plastic materials can then be used to make a great variety of articles such as carpeting, luggage, protective covers, automobile parts, and the like.

In preparing samples for testing in examples that follow, a Brabender mixer with a cam head was used. The maximum temperature used for the various plastic materials was as follows:
ABS—180° C.
PVC—160° C.
CPVC—180° C.
SAN ®—180° C.

For a fuller understanding of the nature and advantages of this invention, reference may be had to the following examples. These examples are given merely to illustrate the invention and are not to be construed in a limiting sense.

EXAMPLE 1

This example demonstrates testing of the PVC plastic material "A" by incorporating therein various amounts of antistatic agents and then testing the modified PVC plastic materials for antistatic properties. PVC "A" was a PVC dispersion resin with intrinsic viscosity of 1.20, bulk density of about 315–400 kg/m$^3$, and particle size of 100% through 200 mesh screen. The antistatic agents used were a homopolymer of epichlorohydrin, identified in Table I as "Homopolymer ECH" and a copolymer of epichlorohydrin, identified in Table I as "Copolymer ECH". Homopolymer ECH has Tg of −25° C., a chlorine content of about 37%, and Mooney viscosity of 90 (1+4@100° C.). Copolymer ECH 65/35 is a copolymer of epichlorohydrin and ethylene oxide in respective weight ratio of 65/35, with a Tg of −42° C., chlorine content of 25%, and Mooney viscosity of 90 (1+4@100° C.).

The samples #1 to #5 were prepared by initially adding the plastic material to the mixer and mixing it for one minute followed by addition of the antistatic agent, which was followed by additional mixing of two minutes. Processing aids were also admixed, where indicated. The soft plastic mass was then removed and cold-pressed between chrome steel plates to a thickness of about 2 millimeters until it was rigid. Testing was conducted with a Monroe #276A Statotester whereas other tests were run pursuant to the ASTM methods. Compositions of test samples and test results are summarized in Table I, below:

TABLE I

| Samples | 1 | 2 | 3 | 4 | 5 |
|---|---|---|---|---|---|
| PVC "A" | 100 | 100 | 100 | 100 | 100 |
| Homopolymer ECH | | 5 | 10 | | |
| Copolymer ECH 65/35 | | | | 5 | 10 |
| "Static Tester" 900 volts for 1 min. R.T., 50% RH | | | | | |
| Volts @ 15 sec. | 465 | 270 | 120 | 160 | 160 |
| Volts @ 30 sec. | 290 | 150 | 20 | 60 | 55 |
| Volts @ 60 sec. | 150 | 20 | 20 | 20 | 20 |
| Tensile, MPa. | 41.4 | 42.7 | 36.5 | 41.4 | 40.0 |
| Elongation, % | 10 | 20 | 70 | 50 | 60 |
| Hardness, D | 78 | 78 | 78 | 78 | 76 |
| Stiffness (ASTM D-747) 5.08 cm. span, 7.27 kg. load | | | | | |
| 3° | 6 | 7 | 5 | 9 | 9 |
| 6° | 14 | 16 | 9 | 19 | 19 |
| 12° | 30 | 33 | 19 | 39 | 37 |
| 18° | 44 | 49 | 27 | 57 | 54 |
| 24° | 57 | 61 | 33 | 72 | 68 |
| 30° | 67 | 70 | 37 | 81 | 76 |
| Surface Resistance @ 500 Volts, ohm-cm × 10$^{10}$ | | | | | |
| | 290 | 5.2 | 1.2 | 73 | 150 |

Examination of the results in Table I indicates the substantial improvement in static dissipation with an increase in the level of antistatic agents. It is also apparent that the improvement in the antistatic properties of the plastic materials is not accompanied by any significant loss of physical properties.

EXAMPLE 2

This example demonstrates the incorporation of antistatic agents Homopolymer ECH and Copolymer ECH 65/35, referred to in Ex. 1, and Copolymer ECH 20/80 into a chlorinated PVC, styrene-acrylonitrile, and ABS plastic materials. Copolymer ECH 20/80 is a copolymer of epichlorohydrin and ethylene oxide in the respective weight ratio of 20/80 having Tg of −52° C. and chlorine content of 9.0%. The chlorinated PVC (CPVC) used had chlorine content of 67%; the styrene-acrylonitrile (SAN) plastic material used was SAN 880; and the ABS plastic material was a copolymer of acrylonitrile, butadiene, and styrene identified as Blendix 131.

The samples of the thermoplastic materials, referred to above, were prepared by blending same with the antistatic polymeric agents and the samples were then tested in the manner described in Ex. 1. Composition of the test samples and test results are given in Table II.

TABLE II

| Samples | 1 | 2 | 3 | 4 | 5 | 6 |
|---|---|---|---|---|---|---|
| CPVC | 100 | 100 | — | — | — | — |
| SAN 880 | — | — | 100 | — | — | — |
| Blendix 131 | — | — | — | 100 | 100 | 100 |
| Copolymer ECH 65/35 | — | 7.0 | 10 | 10 | — | — |
| Copolymer ECH 20/80 | — | — | — | — | — | 6.0 |
| Static Tester | | | | | | |
| Volts @ 15 sec. | — | — | 760 | 520 | 1000 | 100 |

TABLE II-continued

| Samples | 1 | 2 | 3 | 4 | 5 | 6 |
|---|---|---|---|---|---|---|
| Volts @ 30 sec. | — | — | 640 | 360 | 1000 | 40 |
| Volts @ 60 sec. | 820 | 695 | 525 | 220 | 1000 | 20 | the samples and test results are given in Table III, below:

TABLE III

STATIC ELECTRICITY TESTS

| Samples | 1 | 2 | 3 | 4 | 5 | 6 | 7 |
|---|---|---|---|---|---|---|---|
| PVC Pipe Compound | 100 | 100 | 100 | 100 | 100 | 100 | 100 |
| Copolymer ECH 65/35 | — | 4 | 8 | — | — | — | — |
| Copolymer ECH 50/50 | — | — | — | 2 | 4 | 6 | 8 |
|  | 100 | 104 | 108 | 102 | 104 | 106 | 108 |
| Processing Procedure | | | | | | | |
| Banbury Drop Temp., °C. | 178 | 179 | 182 | 179 | 181 | 181 | 183 |
| Mill Roll Temp., °C. | 172 | 172 | 172 | 172 | 172 | 172 | 172 |
| Mill Time, Min. | 4 | 4 | 4 | 4 | 4 | 4 | 4 |
| Press Conditions | 5 min. Preheat, 5 min. Press at 178° C. | | | | | | |
| Tensile Strength, MPa | 49.7 | 41.6 | 32.8 | 40.5 | 40.1 | 35.2 | 33.5 |
| Flexural Modulus, MPa | 3.67 | 3.19 | 2.67 | 3.27 | 2.87 | 2.72 | 2.58 |
| Izod Impact, J/cm | | | | | | | |
| 22° C., | 0.88 | 1.70 | 0.74 | 1.15 | 1.57 | 1.10 | 1.52 |
| −29° C., | 0.38 | 0.61 | 0.55 | 0.60 | 0.61 | 0.58 | 0.65 |
| Heat Distortion Temp. °C. | 73 | 72.5 | 73 | 72.5 | 72.5 | 72 | 72 |
| D-H$_2$O Aged 24 hrs/100° C. % Weight Change | +1.07 | +1.55 | +2.43 | +1.94 | +2.20 | +2.99 | +3.05 |
| Static Tester, Volts (All tests at 23.6° C., 50% Relative Humidity) | | | | | | | |
| Original | | | | | | | |
| Max. Initial charge | 1250 | 1240 | 295* | 760 | 690 | 405* | 325* |
| After 1 min. Discharge | 1190 | 1070 | 0 | 0 | 0 | 0 | 0 |
| After Extensive Processing, Roll Temp. of 176° C., Stock Temp. of 196° C. | | | | | | | |
| 1 min. Mill Time | | | | | | | |
| Max. Initial Charge | — | — | 870 | 810 | — | — | 230 |
| After 1 min. Discharge | — | — | 5 | 30 | — | — | 20 |
| 10 min. Mill Time | | | | | | | |
| Max. Initial Charge | — | — | 820 | 1020 | — | — | 310 |
| After 1 Min. Discharge | — | — | 60 | 820 | — | — | 30 |
| 20 min. Mill Time | | | | | | | |
| Max. Initial Charge | — | — | 1060 | 1120 | — | — | 690 |
| After 1 min. Discharge | — | — | 920 | 1050 | — | — | 60 |
| Ash Pickup (23.5° C., 50% Relative Humidity) | | | | | | | |
| Type of Pickup | Bad | Bad | None | None | None | None | None |

*immediate discharge

EXAMPLE 3

This example demonstrates the use of a typical rigid pipe compound identified as "PVC Pipe Compound", having the properties described in Table III.

The PVC plastic material was mixed with the electrostatic agents copolymer ECH 65/35 of Ex. 1 and Copolymer ECH 50/50 and tested in the manner described in Ex. 1. Copolymer ECH 65/35 is defined in Ex. 1 whereas Copolymer ECH 50/50 is a 50/50 copolymer of epichlorohydrin and ethylene oxide. Composition of

EXAMPLE 4

This example corresponds to Example 3 except a white, flexible PVC compound was used having the properties given in Table IV. Samples 1 to 8 herein were mixed in a Banbury mixer by charging thereinto the masterbatch and the antistatic agent. Stearic acid in amount of 0.75 parts per 100 parts of the PVC plastic was added after addition of the antistatic agent was made, to improve handling. Mixing was conducted until stock temperature reached 163° C. Then, the mixture was placed on 160° C. rolls, mixed for 5 minutes and sheeted-off. There were no handling problems with any of these compounds.

Test results of the modified flexible PVC material are given in Table IV, below:

TABLE IV

| Samples | 1 | 2 | 3 | 4 | 5 | 6 | 7 | 8 |
|---|---|---|---|---|---|---|---|---|
| Flexible PVC Compound | 100 | 100 | 100 | 100 | 100 | 100 | 100 | 100 |
| Copolymer ECH 65/35 | — | 4 | 7 | 10 | — | — | — | — |
| Copolymer ECH 50/50 | — | — | — | — | 2 | 4 | 6 | 8 |
|  | 100 | 104 | 107 | 110 | 102 | 104 | 106 | 108 |
| PHR of Antistat Agent Added | 0 | 8.7 | 15.2 | 21.7 | 4.3 | 8.7 | 13 | 17.4 |
| Specific Gravity, g/cc | 1.421 | 1.417 | 1.413 | 1.409 | 1.419 | 1.417 | 1.412 | 1.410 |
| Stress-Strain Properties (Instron 50.8 cm/Min.), Samples Pressed | | | | | | | | |
| 100% Modulus, MPa | 8.82 | 8.62 | 7.86 | 7.38 | 8.55 | 7.93 | 7.79 | 7.93 |
| 200% Modulus, MPa | 11.86 | 11.51 | 10.48 | 9.79 | 11.58 | 10.62 | 10.34 | 10.41 |
| Tensile, MPa | 13.51 | 14.00 | 12.06 | 12.07 | 13.44 | 12.34 | 11.58 | 12.41 |
| Elongation, % | 280 | 330 | 280 | 260 | 290 | 280 | 280 | 290 |
| Hardness A | 90 | 87 | 86 | 87 | 87 | 87 | 85 | 85 |
| Hardness D | 47 | 35 | 33 | 30 | 30 | 30 | 30 | 30 |
| Static Tester, Volts (All tests at 23.5° C., 50% Relative Humidity) | | | | | | | | |

TABLE IV-continued

| Samples | 1 | 2 | 3 | 4 | 5 | 6 | 7 | 8 |
|---|---|---|---|---|---|---|---|---|
| Original | | | | | | | | |
| Max. Initial Charge | 1330 | 1290 | 1110 | 680 | 1140 | 1050 | 1120 | 570 |
| After 1 min. Discharge | 90 | 0 | 0 | 0 | 0 | 0 | 0 | 0 |
| After Extensive Processing (Mill mixed @ 20 min./171° C.) | | | | | | | | |
| Max. Initial Charge | NT | 1370 | 1180 | 810 | 1170 | 990 | 1140 | 660 |
| After 1 min. Discharge | NT | 0 | 0 | 0 | 0 | 0 | 0 | 0 |
| Electrical Properties (all Data at 23.5° C., 50% Relative Humidity) | | | | | | | | |
| Volume Resistivity, ohm-cm $\times 10^{-10}$ | 455 | 66.5 | 10.6 | 3.9 | 54.8 | 14.8 | 4.4 | 1.2 |
| Dielectric Constant at 1000 Hz. | 5.76 | 6.16 | 6.59 | 6.49 | 6.32 | 6.76 | 7.11 | 7.73 |
| Power Factor at 1000 Hz. | .0900 | .1103 | .1400 | .1470 | .1050 | .1320 | .1670 | .2020 |

EXAMPLE 5

This example demonstrates the importance of the amount of antistatic agent incorporated into ABS plastic material. Copolymer ECH 20/80 and ABS plastic materials are described in Example 2. The samples of ABS plastic materials were prepared by blending same with the antistatic polymeric agent and the samples were then tested in the manner described in Example 1. Composition of the test samples and test results are given in Table V.

TABLE V

| Samples | 1 | 2 | 3 | 4 | 5 |
|---|---|---|---|---|---|
| Blendix 131 | 60 | 60 | 60 | 60 | 60 |
| Calcium Stearate | 1 | 1 | 1 | 1 | 1 |
| Copolymer ECH 20/80 | 0 | 1.5 | 3 | 6 | 9 |
| Static Tester, one minute charge | | | | | |
| Initial Voltage | 1000 | 1000 | 1000 | 1000 | 500[b] |
| T½, sec[a] | c | 33 | 9.0 | 1.25 | 1 |

[a] Time to 50% decay
[b] Could not be charged to 1000 volts
[c] Infinity, the voltage dropped to 950 v in 5 minutes

EXAMPLE 6

This example demonstrates the incorporation of antistatic agents copolymer EBH, Copolymer ECH-PO 37/63 and copolymer ECH-PO 23/77 into an ABS plastic material described in Example 2. Copolymer EBH is a copolymer of epibromohydrin and ethylene oxide in the respective weight ratio of 15/85 having bromine content of 8.6 wt. %. Copolymerw ECH-PO 37/63 and 23/77 are copolymers of epichlorohydrin and propylene oxide in the respective weight ratios of 37/63 and 23/77 having respective chlorine contents of 14.3% and 8.9% on weight basis.

The samples of ABS plastic materials were prepared by blending same with the antistatic polymeric agents and the samples were then tested in the manner described in Example 1. Composition of the test samples and test results are given in Table VI.

TABLE VI

| Samples | 1 | 2 | 3 | 4 | 5 |
|---|---|---|---|---|---|
| Blendix 131 | 60 | 60 | 60 | 60 | 60 |
| Calcium Stearate | 1 | 1 | 1 | 1 | 1 |
| Copolymer EBH | 0 | 6 | 0 | 0 | 0 |
| Copolymer ECH-PO 37/63 | 0 | 0 | 6 | 0 | 0 |
| Copolymer ECH-PO 23/77 | 0 | 0 | 0 | 6 | 0 |
| Homopolymer ECH | 0 | 0 | 0 | 0 | 6 |
| Static Tester - one minute charge | | | | | |
| Initial Voltage | 1000 | 1000 | 1000 | 1000 | 1000 |
| T½, sec[a] | b | 1.2 | 70 | 62 | 129 |

[a] Time to 50% decay
[b] Infinity, the voltage dropped to 950 V in 5 minutes

EXAMPLE 7

This example demonstrates the use of antistatic agents described herein in two commercial polyamide resins identified as Nylon Capron 5526 and Nylon Capron 5556, and an epoxy resin with an EEW of 190. The polyamide resins are examples of thermoplastic materials whereas the epoxy resin is an example of thermosetting materials. The antistatic agent was Copolymer ECH 20/80, earlier identified as a 20/80 copolymer of epichlorohydrin and ethylene oxide. Composition of test samples and test results are summarized in Table VII, below.

TABLE VII

| Samples | 1 | 2 | 3 | 4 | 5 | 6 |
|---|---|---|---|---|---|---|
| Nylon Capron 5526 | 100 | 100 | — | — | — | — |
| Nylon Capron 5556 | — | — | 100 | 100 | — | — |
| Copolymer ECH 20/80 | — | 10 | — | 10 | 5 | 10 |
| Epoxy Resin* | — | — | — | — | 100 | 100 |
| Statictester - charged to 1000 volts DC for 1 minute; RT, 50% RH, (time in seconds to decay to indicated voltage) | | | | | | |
| 500 volts | 1.0 | ** | 1.0 | 0.8 | 5 | 2.5 |
| 368 volts | 1.4 | ** | 1.3 | 1.2 | 21 | 7.0 |
| 250 volts | | 0.5 | | | | |
| 184 volts | | 0.8 | | | | |

*Liquid Diglycydal ether of bisphenol A (EEW) 190
**Sample could not be charged to 1000 volts

We claim:

1. Composition of matter comprising a plastic material and an effective amount of an antistatic agent distributed throughout said plastic material to improve antistatic properties of said plastic material, said antistatic agent is selected from the group consisting essentially of homopolymers of an epihalohydrin and copolymers of an epihalohydrin with at least one other copolymerizable monomer, and said plastic material is selected from the group consisting essentially of a chlorinated polyvinyl chloride, a polycarbonate, a polyester, an epoxy, a phenolic, and mixtures thereof.

2. Composition of claim 1 wherein said antistatic copolymers are composed of 10 to 60 weight parts epihalohydrin and 90 to 40 weight parts of at least one copolymeriable monomer, based on a total of 100 weight parts of said copolymers.

3. Composition of claim 2 wherein said copolymerizable monomer is selected from the group consisting of ethylene oxide, propylene oxide, and mixtures thereof; and amount of said antistatic agent is 2 to 30 weight per 100 weight parts of said plastic material.

4. Composition of claim 3 wherein said plastic material is selected from the group consisting essentially of polycarbonate, polyester, phenolic, and mixtures thereof.

5. Composition of claim 4 wherein said antistatic agent is in solid form and has number average molecular weight in excess of about 60,000, and wherein said epihalohydrin is selected from epichlorohydrin and epibromohydrin.

* * * * *